May 30, 1933.  E. E. METCALF  1,911,637
HARVESTING MACHINE
Filed June 30, 1926   3 Sheets-Sheet 1
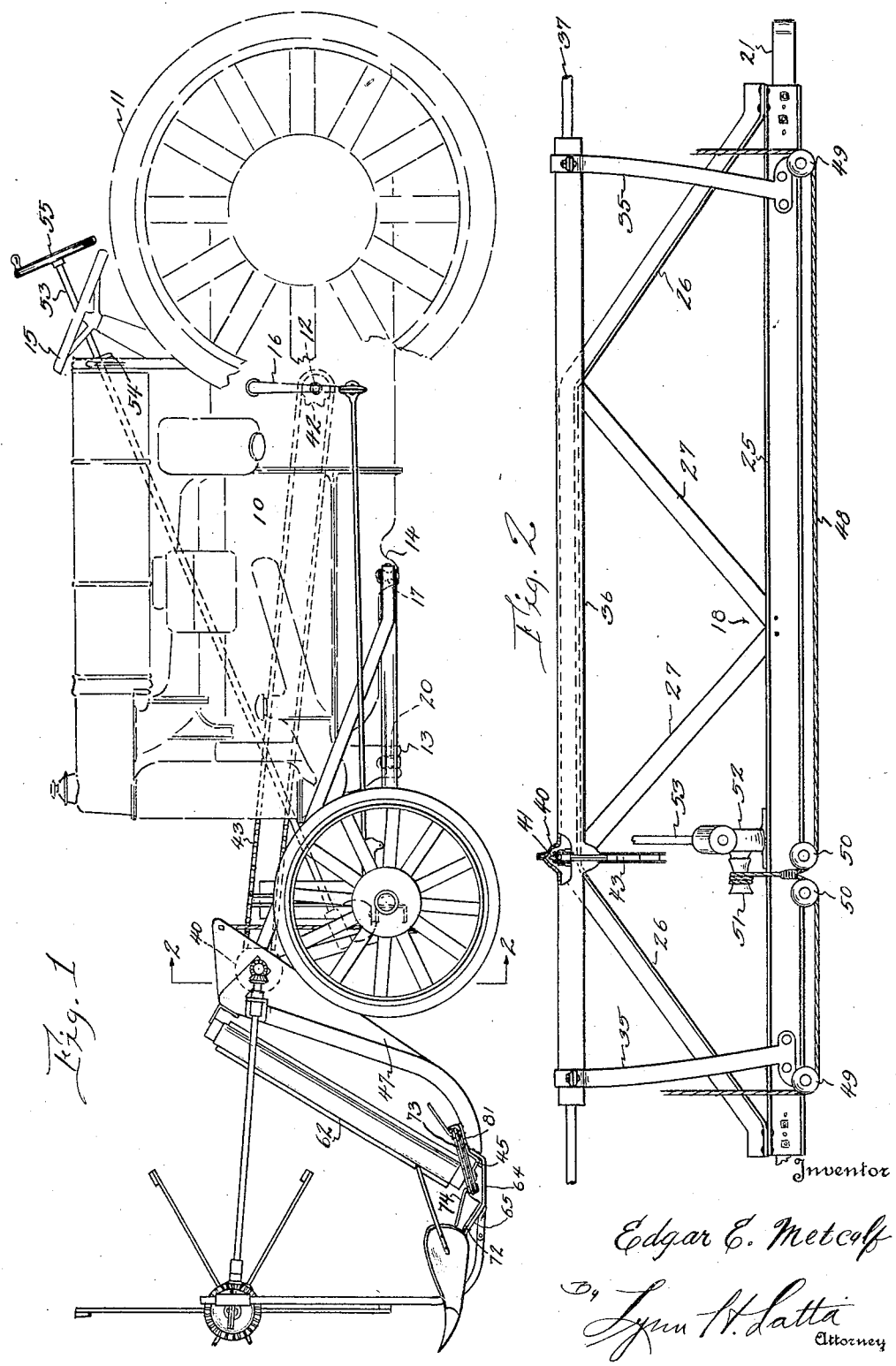

May 30, 1933.  E. E. METCALF  1,911,637
HARVESTING MACHINE
Filed June 30, 1926    3 Sheets-Sheet 2
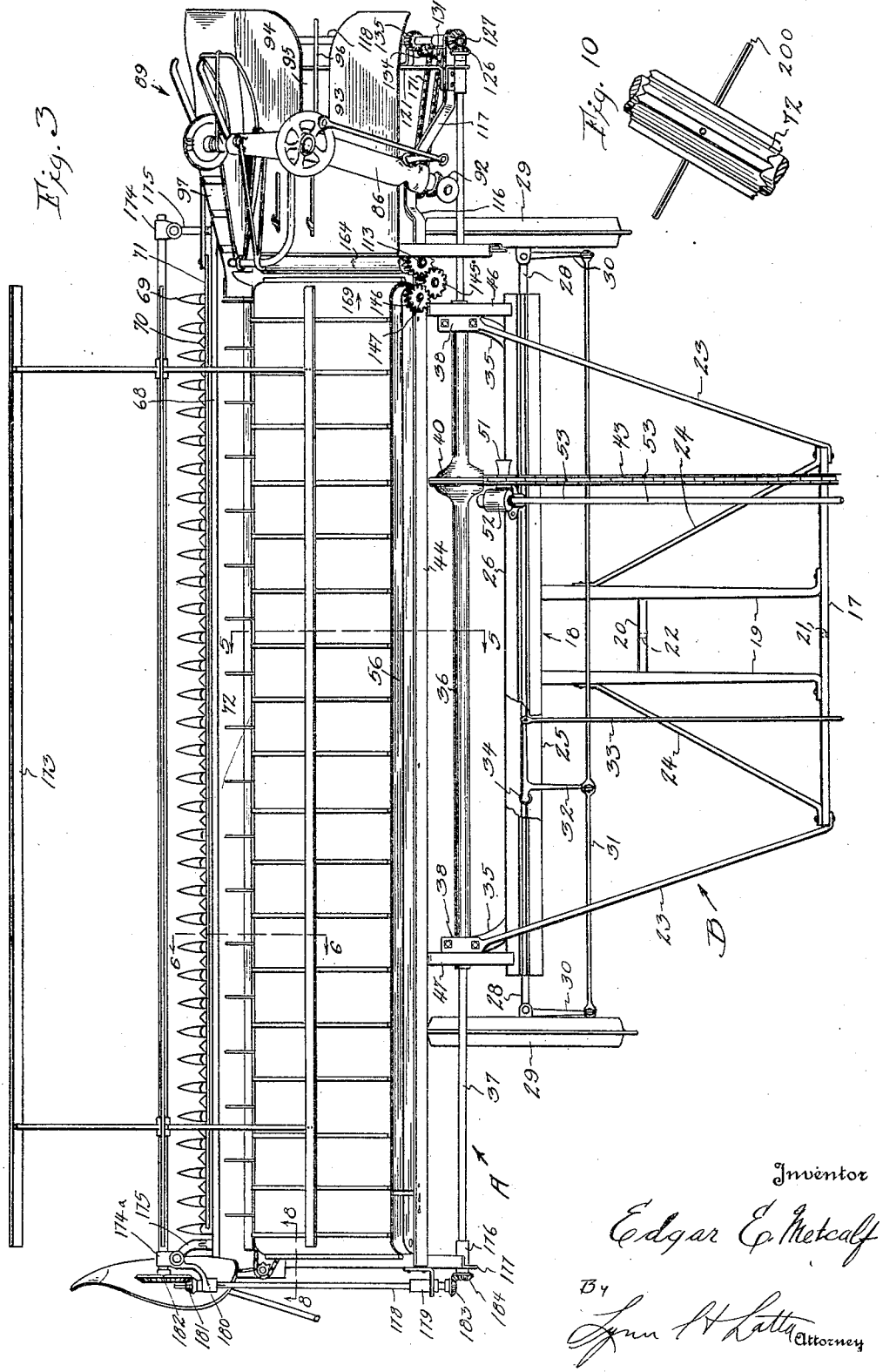

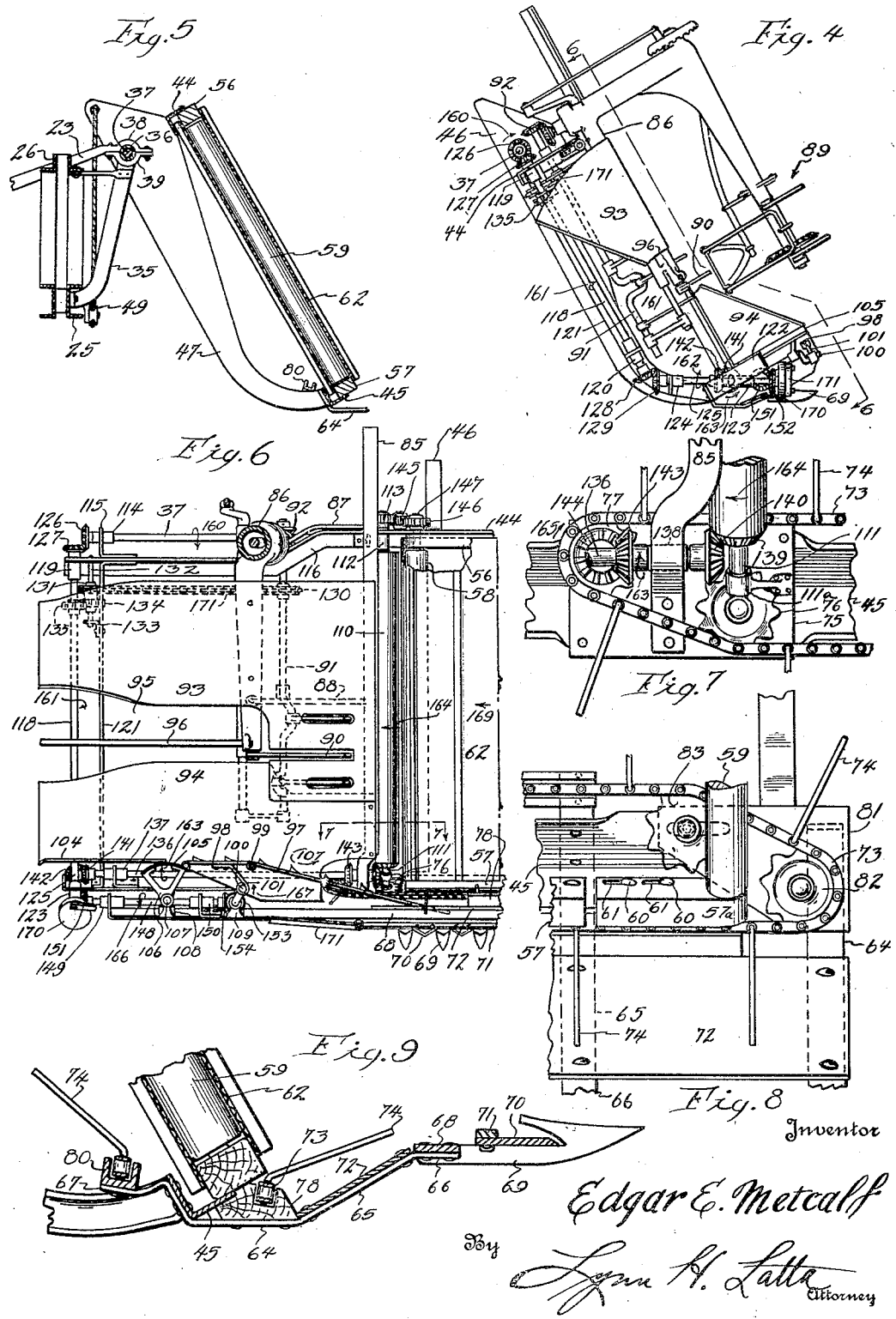

Patented May 30, 1933

1,911,637

UNITED STATES PATENT OFFICE

EDGAR E. METCALF, OF MOVILLE, IOWA, ASSIGNOR TO DEERE & COMPANY, A CORPORATION OF ILLINOIS

HARVESTING MACHINE

Application filed June 30, 1926. Serial No. 119,608.

My invention relates to a tractor driven machine, and it is my object to provide means for converting an ordinary tractor into a combination tractor and driven machine, wherein the driven machine is located forwardly of the tractor to enable the operator to clearly view the operation of the machine, to minimize the pull of the driven machine, and to facilitate control thereof.

A further object of the invention is to provide an attachment for converting a tractor having a front axle with side teetering connection to a combination machine in which the driven machine has the same side teetering connection, to give flexibility to the entire machine when passing over rough ground.

A further object of the invention is to provide such an attachment including a pair of supporting wheels to be substituted for the ordinary front wheels of the tractor, and to provide means for carrying such supporting wheels a much greater distance apart than the ordinary length of a tractor front axle.

A fundamental object of my invention is to provide such an attachment in which the driven machine is carried upon a transverse housing mounted forwardly of the supporting wheels, the driven machine being tiltable about said housing and its mechanism being operated from a shaft journaled within said housing.

More particularly it is my object to provide a tractor driven grain binder with which the grain, instead of being allowed to fall entirely to a horizontal position upon a conveyor, is caught upon a conveyor inclined at an angle of between approximately 45 and 60 degrees, which may be adjusted to meet varying field conditions and handled entirely at that angle during the process of bunching and tying until the bundle is ready to be delivered, the binder, including a conveyor so inclined, being mounted near the rear and upper edge of the conveyor upon a transverse axis, as indicated in the preceding paragraph, so that by swinging the binder about its axis, the sickle teeth, projecting forwardly beyond the lower edge of the conveyor, can be adjusted in height to suit the requirements of field operation, such adjustment being accomplished in a very facile manner without affecting the drive from the tractor to the binder.

Another object of my invention is to provide a simplified binder construction adapted for handling the grain in an inclined position upon an angle, as mentioned, and having a simplified drive taken from the shaft, around which the binder pivots.

Another object of the invention is to provide means for effectively handling the butt of the grain at its successive positions in the machine.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a side elevation of a tractor with my attachment embodied therewith.

Fig. 2 is an elevation of the attachment truss, illustrating the raising and lowering mechanism for the driven machine, and taken as illustrated by the line 2—2 of Fig. 1.

Fig. 3 is a plan view of the attachment, a portion of the tractor being shown in dotted lines.

Fig. 4 is an elevation of the attachment showing the end opposite that shown in Fig. 1.

Fig. 5 is a sectional view taken on the line 5—5 of Fig. 3, illustrating the binder frame and the method of mounting the same on the supporting truss.

Fig. 6 is a detail sectional view of the binding portion of the binder, taken on the line 6—6 of Fig. 4, parts being broken away to better illustrate the construction.

Fig. 7 is an enlarged detail view of that portion of the mechanism shown in Fig. 6, which is indicated by the line 7—7.

Fig. 8 is an enlarged detail view of that portion of Fig. 3 which is indicated by the line 8—8. Figs. 7 and 8 illustrate opposite ends of the butt handling chain.

Fig. 9 is a detail sectional view, taken on the line 6—6 of Fig. 3, and Fig. 10 shows a modified form of the conveyor.

Before proceeding to a detailed description of my invention, it may be stated that there are several disadvantages inhering in the present type of grain binder, which my invention eliminates to the extent of obtaining a very improved machine. One of these objections is the complexity of moving parts, especially in the transmission of power to the various elements of the binder. Another is the extent of the draft of the machine. In the ordinary binder it is necessary to elevate the grain, after it has been cut, upon a horizontal conveyor or platform, to the binding or bundling mechanism. The elevator and the arrangement of the binding mechanism in connection therewith can be eliminated and simplified by mounting the conveying platform to catch the grain directly after it is cut, so that the grain is not allowed to drop to the level of cutting, but is supported in a reclining position, and thence fed to the binding mechanism while still in such position.

The weight of the grain against the canvas of the conveyor is cut to only a fraction (less than one-third) of the weight of the same grain reclining completely upon a horizontal conveyor, and the majority of the weight of the grain can be carried upon a smooth sheet metal shelf, against which the butts slide before the urge of a suitable conveyor chain. Consequently, by so mounting the conveyor upon an angle and upon an axis near its rear edge, the sickle projecting forwardly from the lower and forward edge of the conveyor will have the greatest amplitude of swing when the conveyor is raised or lowered about its axis, and thus the sickle, which is the portion of the machine desired to be adjusted, can be swung without undue raising and lowering of the rest of the binder. The amount of power required to regulate the height of the binder is thus minimized. Furthermore, the entire mechanism of the binder is contained above a plane extending downwardly and forwardly from the axis thereof and very little below said axis, whereby the entire binder may be swung upwardly entirely clear of a plane slightly below its axis in order to negotiate ditches and large obstructions.

Describing the invention in detail, the attachment comprises mainly, two portions— the binder proper, which has been indicated by the reference letter A in Fig. 3, and the attachment frame, B, which combines with the tractor to support the same and to support the binder.

In Fig. 1, I have shown an ordinary make of tractor having the engine, 10, the rear traction wheels, 11, the belt pulley shaft, 12 (indicated in dotted lines), the front axle yoke, 13, the front axle radius rod yoke, 14, the steering wheel, 15, and the steering arm, 16.

In this tractor, as in most tractors, the front axle is pivoted in the yoke, 13, by means of a single king pin, and is braced to the body of the tractor by means of a radius rod similarly pivoted in the yoke, 14. Thus, the front axle is allowed to teeter laterally, independent of the lateral movement of the body of the tractor.

In order to preserve this flexibility in my attachment I form the frame, B, with a rear cross member, 17, designed to be received in the yoke, 14, a truss, 18, connected to the rear cross member, 17, by means of longitudinal rails, 19, and a cross member, 20, supported between the rails, 19, and adapted to be received in the yoke, 13. Openings, 21 and 22, respectively (shown in dotted lines in Fig. 3) are designed to receive bolts or pins to connect the members, 17 and 20, respectively, to the tractor body.

In order to obtain rigidity for the forwardly extending frame structure, including the rails, 19, and for the further purpose of supporting the longitudinal housing brackets, 23, the ends of the cross member, 17, are extended a considerable distance beyond the rails, 19, and braced forwardly to the rails by means of diagonal braces, 24.

The truss, 18, comprises a pair of horizontal channel bars, 25, each surmounted by an arch, 26, and spaced apart to receive the diagonal cross braces, 27, and the stub axles, 28, which are bolted between the ends of the channels, 25. Thus, the length of the axles, 28, may be varied.

The wheels, 29, are mounted at the ends of the axles in the ordinary manner of tractor front wheels, and are provided with steering arms, 30, connected by a connecting rod, 31, to an intermediate bell crank steering lever, 32, which in turn is connected by means of a drag link, 33, to the steering arm, 16, of the tractor. The bell crank lever, 32, is pivoted at 34 in a bearing secured between the channels, 25. It is thought the operation of the steering mechanism is obvious from the above description.

Mounted in brackets, 35, secured to the channels, 25, and extending upwardly therefrom, is a transverse horizontal housing, 36, in which is journaled a power transmission shaft, 37. The housing, 36, is clamped in place by the longitudinal brackets, 23, which are provided at their ends with caps, 38, bolted to sockets, 39, formed at the upper ends of the brackets, 35. It will thus be seen that the housing may be readily removed, if desired, for replacement, repair or for the reception of other mechanism in the brackets, 35.

Intermediate the ends of the housing is formed a sprocket case, 40, which houses a sprocket, 41, mounted upon the shaft, 37, and geared to a sprocket, 42 (shown in dotted lines in Fig. 1) on the belt pulley shaft, 12, by means of a chain, 43.

The binder, A, comprises generally a pair of transverse horizontal angle iron frame members, 44 and 45 (see Fig. 5), which are secured in spaced relation by a pair of spiders, 46 and 47 (see Fig. 3). The spiders are approximately of the peculiar shape shown in Fig. 5, leaving an enlarged space between the plane of the angle irons, 44 and 45, near the lower portion of the frame, in order to receive the conveyor chains, which will later be described. The spiders, 46 and 47, are journaled as indicated in Figs. 5 and 3, upon the ends of the housing, 36, which project beyond the brackets, 35.

The projecting upper ends of the spiders, 46 and 47, extend over the truss, 18, and chains or cables, 48 are extended therefrom around pulleys, 49 and 50, mounted on the truss, to the drum, 51, of a windlass, 52. The windlass, 52 is of a common construction including a worm wheel and worm (not shown), the latter being driven from a shaft, 53, extending upwardly adjacent the tractor, suitably supported as by a bracket, 54, secured to the body of the tractor and provided with a handwheel, 55, by means of which the worm may be rotated to rotate the drum, 51.

The raising and lowering of the spiders, 46 and 47, is thought to be obvious from the preceding description.

Secured to the angle irons, 44 and 45, respectively, are hard wood rails, 56 and 57, (Fig. 5), in the ends of which are journaled rollers, 58 and 59, (Figs. 6 and 8 respectively). The rails are severed near their ends which carry the roller, 59, as shown in Fig. 8, and the severed portions, 56a and 57a, are adjustably secured to the angle irons by means of bolts, 60, extended through slots, 61, in the rail portions.

A slatted canvas conveyor, 62, is stretched between the rollers, and may be tightened by adjustment of the roller, 59, outwardly, the bolts, 60, being loosened for this purpose. It will be noted (Fig. 9) that sufficient space is left between the lower edges of the rails and the inner flanges of the angle irons to accommodate the conveyor, 62.

Secured at intervals to the lower angle iron, 45 (Figs. 8 and 9) are a number of strap iron brackets, having the horizontal portions, 64, extending forwardly from the lower corner of the angle iron, the upwardly inclined portions, 65, the forwardly extending ends, 66, and the rearwardly extending ends, 67. The ends, 66, carry the sickle bar, 68, to which are attached the sickle guards, 69, provided with the usual sickle teeth, 70, and cutter bar, 71.

It will be noted that the sickle is thus raised above the normal extremity of the conveyor, and the grain, after being cut, will be allowed to slide downwardly over the bar, 68, onto the butt shelf, 72, which is formed by a plate of sheet metal secured to the bracket portion, 65. The shelf, 72, is substantially perpendicular to the conveyor, 62.

In order to positively engage the butts of the grain to carry them forwardly toward the binding mechanism, I provide a butt conveyor including a chain, 73, and tines, 74.

Before proceeding further with the detailed description of the butt conveyor, it may be stated that the angle irons, 44 and 45, at the binder end of the machine are projected beyond the roller, 58, to carry the binding apparatus. Just beyond the roller, 58, and adjacent thereto the angle iron, 45, has its edges flattened and lowered to receive a plate, 75, (Fig. 7) upon which are journaled (on studs which are not shown) sprockets, 76 and 77.

The sprocket, 76, is positioned adjacent the roller, 58, and near the outer edge of the angle iron so as to carry the chain, 73, just beyond the forward extremity of the angle iron (Fig. 9). A hard wood guide, 78, is secured between the horizontal bracket portion, 64, and the lower face of the angle iron, and serves both as a means of rigidifying the brackets, and also to receive the outer portion of the chain, 73. For this purpose it is provided with a longitudinal groove, 79.

It will be noted that the plane of the chain, 73, is tilted slightly toward the rear so as to allow the inner portion of the chain to rest in a hard wood channel, 80, positioned just above the ends of the spiders, 46 and 47, and secured to the bracket ends, 67. This plane is substantially the plane of the edges of the angle iron, 45, which facilitates the attachment of the plates, 75 and 81 in their proper positions.

The grain side end of the angle iron, 45, has its edges depressed to receive the plate, 81, (Fig. 1) in the same manner as the portion which receives the plate, 75. Sprockets 82 and 83 are journalled on the plate 81 and aligned with the sprockets 76 and 77. (Figs. 7 and 8).

The downwardly arched formation of the spiders, 46 and 47, accommodates the inner portion of the conveyor, the tines, 74, extending upwardly at the correct angle so as to clear both the conveyor canvas, 62, and the spiders.

Spaced beyond the roller, 58, and secured between the angles, 44 and 45 (Figs. 6 and 7) is a table slide, 85, which extends upwardly beyond the angle, 44, to slidably support the binding head, 86. Brackets, 87 and 88, of the ordinary construction connect the binder head with the slide, 85.

The binding apparatus, being of an old construction, I will describe only briefly its arrangement and adaptation to my invention.

Portions of the bundling and tying apparatus are indicated at 89 in Figs. 3 and 4, the needle at 90, and the kicking mechanism gear shaft at 91. The shaft, 91, drives the various parts of the binder head through the usual bevel gear connection, 92.

The binding table comprises the upper table, 93, secured to the lower leg of the binder head, and the lower table, 94, secured to the slide bar, 85 (Fig. 4 and 6). The upper table is cut away to leave a space, 95, and a fulcrum rod, 96, extends through this space and is secured to the lower leg of the binder head, 86. It will now be seen that as the binder head is adjusted upwardly, the table, 93, and fulcrum rod, 96, will move with it.

The butts of the grain are supported upon a reciprocating butter having the portions, 97 and 98 hinged together at 99, and actuated by a crank shaft, 100, which is connected to the portion, 98, by means of a bracket, 101, so as to give the butter a motion, as indicated by the arrow, 102. The free end of the portion, 97, slides in the slot, 103, in the shelf, 72, (Fig. 3). Beyond the portion, 98, a stationary plate, 104, secured to the table, 94, supports the butts of the bundles just before discharge from the machine.

A curved plate, 105, closes the gap between the portion, 98, and plate, 104, and is supported by a bracket, 106, pivoted upon a shaft, 107. The shafts, 107 and 100, are supported by brackets, 108 and 109, secured to the extended end of the sickle bar, 68.

Referring to Fig. 7, it will be noted that the sprockets, 76 and 77, are staggered so that a portion of the chain, 73, moves inwardly upon an incline to remove the tines, 74, from contact with the grain at the same time that the butter portion, 97, catches the same.

It will be noted that the grain is raised upwardly as it passes through the binding mechanism. The object of this is to more effectively shake the stalks of grain to a position with their butts together.

After the bundles have been bound they are kicked out of the machine by the kickers, and in passing over the tables, 94 and 93, they will be moved to a horizontal position by the curved ends of the plates, the lower one being bent upwardly and the upper one downwardly to bring the outer edges to a line more nearly approaching the horizontal (Fig. 4). In thus twisting toward horizontal position the bundles will be balanced upon the rod, 96, and it will be noted that in moving the binder head upwardly the rod will follow the center of the bundle where the tying is being done and thus be in the correct position to balance the same.

Between the slide, 85, and the conveyor, 62, is an intermediate roller, 110, the shaft, 111, of which is journaled at its lower end in the sprocket, 76, a bearing, 111a.

At its upper end the shaft is journaled in a bearing, 112, secured in the angle iron, 44, and projects therebeyond to receive a gear, 113.

I will now describe the gearing mechanism for driving the entire binder.

The binder end of the shaft, 37, is journaled in a self-aligning bearing, 114, supported by a bracket, 115, secured to the end of the angle iron, 44, the latter being bent first forwardly and downwardly, as at 116, to clear the binder head, 86, and thence rearwardly and downwardly, as at 117, (Fig. 3) to reach the shaft, 37.

A shaft, 118, is journaled in bearings, 119 and 120, supported by the angle iron, 44, and by a cross bar, 121, which extends from the angle iron, 44, to the angle iron, 45, just inside of the shaft, 118. The outer end of the angle iron, 45, is extended forwardly and upwardly, as at 122 in Fig. 4, and carries a bearing, 123, between which and a bearing, 124, secured to the bar, 121, is journaled a horizontal shaft, 125. Bevel gears, 126 and 127, on the shafts, 37 and 118, mesh to transmit power therebetween, and bevel gears, 128 and 129 similarly transmit power from the shaft, 118, to the shaft, 125.

In order to drive the binder shaft, 91, a pair of aligned sprockets, 130 and 131 (Fig. 6) are secured to the shaft, 91, and to a counter shaft, 132, supported between the angle iron, 44, and a bracket, 133, on the bar, 121. Spur gears, 134 and 135, secured to the counter shaft, 132, and the shaft, 118, respectively, transmit rotation therebetween.

In order to drive the conveyor, 62, and the roller, 110, I provide a shaft, 136, journaled in bearings, 137 and 138, secured to the angle iron, 45, and slide, 85, respectively. (Figs. 6 and 7.) A bevel gear, 139, is secured to the shaft, 111, and a bevel gear. 140, on the end of the shaft, 136, meshes therewith. Bevel gears, 141 and 142 (Figs. 4 and 6) on the shafts, 136 and 125, respectively, mesh to transmit power from the latter to the former.

The shaft, 136, also drives the conveyor chain, 73, through the medium of a gear, 143, on the shaft, 136, meshing with a gear, 144, on the sprocket, 77 (Fig. 7).

Power is transmitted from the shaft, 111, through the spur gear, 113, and an idler, 145, supported on the angle iron, 44, to a gear, 146, on the projecting shaft 147, of the roller 58.

The crank shaft, 100, is driven by means of a shaft, 148, journaled in bearings, 149 and 150, on the sickle bar, 68 (Fig. 6), and provided with a bevel gear, 151, meshing with a bevel gear, 152, on the shaft, 125. A bevel gear, 153, on the crank shaft, 100, between the bracket, 109, and the bar, 68, (indicated in Fig. 6) meshes with a bevel gear, 154, on the shaft, 148.

It will now be seen from an inspection of the drawings that the shaft, 37, rotated in the direction indicated by the arrow, 160, will rotate the shaft, 118, in the direction indicated by the arrow, 161, which in turn will rotate the shaft, 125, in the direction indicated by the arrow, 162. The shaft, 125, will thence drive the shaft, 136, in the direction indicated by the arrow, 163, and the shaft, 136, will drive the roller, 139, in the direction indicated by the arrow, 164, and the sprocket, 77, in the direction indicated by the arrow, 165. The shaft, 125, will drive the shaft, 148, in the direction indicated by the arrow, 166, and the crank shaft will thus be driven in the direction indicated by the arrow, 167.

To the end of the shaft, 125, is secured a crank wheel, 170, and the ordinary pitman, 171, is extended from the wheel, 170, to the cutter bar, 71.

The conveyor, 62, is driven in the direction indicated by the arrow, 169.

It will be noted that the drives to the various portions of the machine are extended entirely from the two shafts, 118 and 125, to reach all of the operative portions thereof.

Only one chain, namely, the chain, 172, which connects the sprockets, 131 and 130, to drive the binder head is necessary in the drive.

The binder is provided with the usual reel, 173, mounted in bearings, 174 and 174a, slidably carried by the brackets, 175. The usual means for raising and lowering the reel is not illustrated. The reel is driven from the other end of the shaft, 37, which is journaled in a bearing, 176, carried by a frame bar, 177, (Fig. 1) at the grain end of the machine. A shaft, 178, is mounted in bearings, 179 and 180, carried by the bar, 177, and bearing, 174a, respectively, and has a squared end receiving a bevel pinion, 181, which drives the bevel gear, 182, on the reel shaft. Thus, the thrust against the shaft, 35, by the bevel gear, 127, is balanced by the thrust of the bevel gear, 183, which meshes with the bevel gear, 184, on the shaft, 35.

Among the advantages of my machine are its quick adaptability to various field conditions. For instance, in harvesting sweet clover for seed it is desirable to cut just the heads, and the sickle must be several feet from the ground for this purpose. In cutting wheat that is badly fallen the binder may be lowered to the extreme position shown in Fig. 4. Under normal conditions the conveyor will stand at approximately 45 degrees. In the extreme lowered position shown in the drawings the conveyor will assume a position approximating 60 degrees. The successful handling of the grain upon such widely diverging inclinations of the conveyor is accomplished by the trough formation between the conveyor and the butt shelf and the positioning of the sickle above the upper edge of the shelf, whereby the stalks of grain are allowed to slide downwardly in their movement rearwardly toward the conveyor. Under extreme conditions the conveyor may be elevated to a substantially horizontal position, the shelf serving no longer to support the grain, but allowing it to drop perpendicularly to the conveyor.

In Fig. 10, I have shown a slightly modified form of the conveyor, in which it is provided with tines, 200, to insure the upright position of the grain upon the conveyor where a very heavy field of grain is being worked. With the use of such tines the roller, 58, may be separated to provide a space for the tines to pass.

It is to be understood that while under normal conditions the machine is most satisfactorily operated when the conveyor is inclined between the limits of 45° and 60° to the horizontal, that these limits, especially the 45° limit, may be exceeded somewhat under some conditions, without departing from the true spirit of my invention. For instance, when cutting very tall grain, it may be desirable or necessary to cut the stalks close to their heads so that the bundles may not be excessively weighted with straw. Under these conditions, it may be desirable to elevate the conveyor beyond the 45° limit, although as the horizontal position is neared, the efficiency of the machine in handling the grain after it is cut decreases, due to the substantially increased distance that the grain must fall before reaching the conveyor.

The most satisfactory operation is had between the 45° and 60° limits, due to the following two facts:

First, the inclination must be sufficient so that the grain will be laid over sufficiently so that it will be held against the outer surface of the conveyor by its own weight when standing on end so that it may be moved along in that position to the binder table. The inclination must be far enough away from the horizontal so that the weight of the stalks not only holds them against the conveyor but arranges them against the butt shelf also so that their butts will be all brought to the same plane by virtue of their resting against the butt shelf while traveling over the conveyor.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a binding machine, a frame mounted in a position normally inclined at an angle of between 45° and 60° to the horizontal for movement around a horizontal axis positioned near its upper extremity, said frame projecting forwardly from said axis and being provided at its lower extremity with a sickle, an endless conveyor mounted on said frame for travel parallel to said horizontal axis, a binding table positioned adjacent the discharge end of said conveyor and substantially coplanar therewith, and a butt shelf intermediate the conveyor and sickle, said shelf being substantially perpendicular to the plane of the conveyor and projecting upwardly therefrom.

2. In a binding machine, a frame mounted in a normally inclined position for movement around a horizontal axis positioned near its upper extremity, said frame projecting forwardly from said axis at an angle of between 45° and 60° to the horizontal and being provided at its lower extremity with a sickle, and an endless conveyor mounted on said frame for travel parallel to said horizontal axis.

3. In a binding machine, a frame mounted in a normally inclined position for movement around a horizontal axis positioned near its upper extremity, said frame projecting forwardly from said axis at an angle of between 45° and 60° to the horizontal and being provided at its lower extremity with a sickle, an endless conveyor mounted on said frame for travel parallel to said horizontal axis, and a butt shelf intermediate the conveyor and sickle, said shelf being substantially perpendicular to the plane of the conveyor and projecting upwardly therefrom.

4. In a binding machine, a forwardly and downwardly inclined conveyor mounted to move in a horizontal direction, a sickle at the lower extremity of the conveyor, and a binding table positioned adjacent the discharge end of said conveyor said binding table being inclined and substantially coplanar with said conveyor.

5. In a binding machine, a forwardly and downwardly extending conveyor inclined at an angle of between 45° and 60° to the horizontal mounted to move in a horizontal direction, a sickle at the lower extremity of the conveyor, a binding table positioned adjacent the discharge end of said conveyor and substantially co-planar therewith, and a butt shelf intermediate the conveyor and sickle, said shelf being substantially perpendicular to the plane of the conveyor and projecting upwardly therefrom.

6. In a machine of the class described, a forwardly and downwardly extending conveyor mounted to move in a horizontal direction, a sickle at the lower extremity of the conveyor, and a butt shelf intermediate the conveyor and sickle, said shelf projecting upwardly therefrom at an angle greater than approximately 30° to the horizontal.

7. In a binding machine, in combination with a tractor having an independent power shaft, a horizontal tubular casing mounted on the forward portion of said tractor and extending transversely thereof, a frame journaled on said casing to swing fore and aft, and extending normally downwardly and forwardly therefrom, a conveyor mounted in said frame for movement parallel to said casing, a sickle on the frame forward of the lower portion of the conveyor, and means for driving said sickle and said conveyor, including a shaft mounted to rotate within the casing and geared to said power shaft and to the sickle and conveyor.

8. In a binding machine, in combination with a tractor having an independent power shaft, a horizontal tubular casing mounted on the forward portion of said tractor and extending transversely thereof, a frame journaled on said casing to swing fore and aft, and extending normally downwardly and forwardly therefrom, a conveyor mounted in said frame for movement parallel to said casing, a sickle on the frame forward of the lower portion of the conveyor, binding mechanism carried by the frame at one end of the conveyor, a transmitting shaft mounted to rotate within the casing and geared to said power shaft, and means for driving the sickle, the conveyor and the binding mechanism, from said transmitting shaft.

9. In combination with a tractor having a power shaft, and having axle and radius rod clevises, a driven machine attachment comprising a pair of horizontal rails, a rear crossbeam connecting the rear ends of the rails and receivable in the radius rod clevis, an intermediate cross beam secured between the rails and receivable in the axle clevis, a truss connecting the forward ends of the rails and provided at its ends with frontwheel stub axles, a transversely disposed horizontal tubular casing carried by the truss, a transmitting shaft journaled within the casing and geared to the power shaft, a driven machine pivotally mounted upon the casing for fore and aft swinging movement therearound, and driving connections from said transmitting shaft to said driven machine.

10. In combination with a tractor having a power shaft, and having axle and radius rod clevises, a driven machine attachment comprising a pair of horizontal rails, a rear cross beam connecting the rear ends of the rails and receivable in the radius rod clevis, an intermediate cross beam secured between the rails and receivable in the axle clevis, a truss connecting the forward ends of the rails and provided at its ends with front wheel stub axles, a horizontal casing carried by the truss, a transmitting shaft journaled within the casing and geared to the power shaft, a driven machine having frame members journaled upon the casing and projecting forwardly and rearwardly therefrom, the forward portion of the frame members serving to carry the bulk of the driven machine and the rearwardly extending portions being secured to cables extending downwardly around pulleys on the truss and thence to a windlass, and means projecting rearwardly and upwardly from said windlass for actuating the same, said machine being driven from the transmitting shaft.

11. In a machine of the class described, a tractor having a power shaft, a transversely disposed horizontal tubular casing mounted on the tractor and extending transversely across the forward portion thereof, a transmitting shaft extending through the casing to rotate therein and geared to the power shaft, a binding machine pivotally mounted on the casing for fore and aft swinging movement thereround, said binding machine including a binder head, and a reel, and gearing mechanism extending from the respective ends of the transmitting shaft to the binder head and the reel, respectively.

12. In a binding machine, a forwardly and downwardly inclined conveyor mounted to move in a horizontal direction, a sickle at the lower extremity of the conveyor, and a binding table positioned adjacent the discharge end of said conveyor, said binding table being inclined and substantially coplanar with said conveyor during a majority of its length and twisted at its discharge end so as to approach a horizontal plane.

13. In a binding machine, a forwardly and downwardly inclined conveyor mounted to move in a horizontal direction, a sickle at the lower extremity of the conveyor, and a binding table positioned adjacent the discharge end of said conveyor, said binding table being inclined and substantially coplanar with said conveyor during a majority of its length and being longitudinally operated into fixed and movable portions and a fulcrumed rod positioned between said fixed and movable portions.

14. In a binding machine, a forwardly and downwardly inclined conveyor mounted to move in a horizontal direction, a sickle at the lower extremity of the conveyor, and a binding table positioned adjacent the discharge end of said conveyor, said binding table being inclined and substantially coplanar with said conveyor, a butt shelf intermediate the conveyor and sickle, said shelf being substantially perpendicular to the plane of the conveyor and projecting upwardly therefrom so as to form with said conveyor a horizontal trough with upwardly inclined sides in which grain stalks may be supported partially upon their sides and partially at their ends and a reciprocating butter at the lower extremity of the binding table, said butter forming a continuation of the butt shelf and being substantially coplanar at its end adjacent said shelf.

15. In a binding machine, a forwardly and downwardly inclined conveyor mounted to move in a horizontal direction, a sickle at the lower extremity of the conveyor, and a binding table positioned adjacent the discharge end of said conveyor, said binding table being inclined and substantially coplanar with said conveyor, a butt shelf intermediate the conveyor and sickle, said shelf being substantially perpendicular to the plane of the conveyor and projecting upwardly therefrom so as to form with said conveyor a horizontal trough with upwardly inclined sides in which grain stalks may be supported partially upon their sides and partially at their ends and a reciprocating butter at the lower extremity of the binding table, said butter forming a continuation of the butt shelf and being substantially coplanar at its end adjacent said shelf, said butter being inclined upwardly toward its discharge end.

16. In a binding machine, a forwardly and downwardly inclined conveyor mounted to move in a horizontal direction, a sickle at the lower extremity of the conveyor, and a binding table positioned adjacent the discharge end of said conveyor, said binding table being inclined and substantially coplanar with said conveyor, a butt shelf intermediate the conveyor and sickle, said shelf being substantially perpendicular to the plane of the conveyor and projecting upwardly therefrom so as to form with said conveyor a horizontal trough with upwardly inclined sides in which grain stalks may be supported partially upon their sides and partially at their ends, the normal angle of inclination of the conveyor ranging approximately between 60° and 45°, whereby grain will, of its own weight, securely remain in position against the conveyor.

17. In a machine of the class described, a tractor having a power shaft, a carrying frame carried by the tractor and located forwardly thereof, a horizontal casing supported above said carrying frame, a driven machine having frame members journaled upon the casing and projecting forwardly and rearwardly therefrom, the forward portions of the frame members serving to carry the bulk of the driven machine and the rearwardly extended portions being secured to cables extending downwardly around pulleys on the carrying frame and thence to a windlass and means for actuating said windlass.

18. An attachment for a tractor having a front axle clevis and a radius rod clevis, comprising a pair of longitudinal rails, a rear cross beam connecting the rear end of the rails and receivable in the radius rod clevis, an intermediate cross beam secured between the rails and receivable in the axle clevis, a truss connecting the forward ends of the rails and provided at its ends with front wheel stub axles, and a swinging frame of a driven machine, carried by said truss and mounted for swinging movement about a horizontal, transverse axis.

19. The combination with a tractor having a power shaft, of a wheel supported tubular casing connected with the tractor to rock relatively thereto, and extending transversely thereof, an implement pivotally supported by said casing to swing about the same as an axis, a drive shaft rotatable in said casing, a driving connection between said drive shaft and an operating part of the implement, and a driving connection between said power shaft and said drive shaft.

20. The combination with a tractor having a power shaft, of a wheel supported tubular casing disposed transversely in front of the tractor and connected therewith to rock relatively thereto, an implement pivotally supported by said casing to swing fore and aft about the same as an axis, a drive shaft rotatable in said casing, a driving connection between said drive shaft and an operating part of the implement, a driving connection between said power shaft and said drive shaft, and means on the tractor operable to swing said implement with respect to said casing.

21. In a binder, the combination with a wheeled frame comprising a horizontal transversely disposed drive shaft, of supporting means pivoted to swing about said shaft as an axis independently thereof and extending downwardly and forwardly therefrom, grain cutting and conveying devices carried by said supporting means, and driving connections between said shaft and said cutting and conveying devices.

22. In a binder, the combination with a wheeled frame comprising a transversely disposed horizontal drive shaft, of supporting means pivoted adjacent to its upper end to swing fore and aft about said shaft as an axis and extending downwardly and forwardly therefrom, a transversely disposed sickle mounted on the lower forward portion of said supporting means, an inclined conveyor mounted on said supporting means, back of said sickle to receive the grain cut thereby, and driving connections between said shaft and said sickle and conveyor.

23. In a binder, the combination with a wheeled frame comprising a transversely disposed horizontal drive shaft, of downwardly extending members pivoted adjacent to their upper ends to swing fore and aft about said shaft as an axis, a transversely disposed sickle carried on the lower forward portions of said members, a conveyor mounted on said members in an inclined position between said sickle and said shaft, and driving connections between said shaft and said sickle and conveyor.

24. In a binder, the combination with a wheeled frame, and supporting means pivotally suspended adjacent to its upper end from said frame to swing fore and aft, of grain cutting and conveying devices carried by said supporting means comprising a transversely disposed sickle, a butt shelf extending downwardly and rearwardly from the plane of the sickle, and an inclined conveyor adapted to receive and convey the cut stalks of grain in an inclined position with their butt ends resting on said shelf.

25. In a binder, the combination with a wheeled frame, and supporting means pivotally suspended adjacent to its upper end from said frame to swing fore and aft, of grain cutting and conveying devices carried by said supporting means comprising a transversely disposed sickle, a butt shelf extending downwardly and rearwardly from the plane of the sickle, and an inclined conveyor adapted to receive and convey the cut stalks of grain in an inclined position with their butt ends resting on said shelf, and a binder table alined with said conveyor and having means for binding the inclined stalks to form bundles.

26. In a binder, the combination with a wheeled frame, and supporting means pivotally suspended adjacent to its upper end from said frame to swing fore and aft, of grain cutting and conveying devices carried by said supporting means comprising a transversely disposed sickle, a butt shelf extending downwardly and rearwardly from the plane of the sickle, an inclined conveyor adapted to receive and convey the cut stalks of grain in an inclined position with their butt ends resting on said shelf, a binder table alined with said conveyor and having means for binding the inclined stalks to form bundles, and means for rotating the bundles to an approximately horizontal position in discharging the same.

27. In a binder, an inclined binder table adapted to support bundles of grain standing on end with the butt ends of the stalks lowermost and having the head supporting portion and the butt supporting portion of its discharge end curved downwardly and upwardly, respectively.

28. In a binder, an inclined binder table having an upper head supporting portion and a lower butt supporting portion, and means for moving the bundles of grain standing on end along said table, said head and butt supporting portions being curved downwardly and upwardly, respectively, at the discharge end of the table.

29. In a binder, the combination with grain cutting mechanism and an inclined conveyor adapted to receive the stalks of grain standing on end and convey them in an inclined position with their butts lowermost, of an inclined binder table associated with said conveyor, means for binding the stalks on said table into bundles, and means for rotating the bundles to discharge them in an approximately horizontal position.

30. In a binder, an inclined binder table having an upper head supporting portion and a lower butt supporting portion, means for moving the bundles of grain standing on end along said table, said head and butt supporting portions being curved downwardly and upwardly, respectively, at the discharge end of the table, and means for supporting the bundles intermediately of their length as they are turned by the curved portions of the table.

31. In a binder, the combination with grain cutting mechanism and an inclined conveyor adapted to receive the stalks of grain standing on end and convey them in an inclined position with their butts lowermost, of an inclined binder table associated with said conveyor, means for binding the stalks on said table into bundles, means for rotating the bundles to discharge them in an approximately horizontal position, and means for supporting the bundles intermediately of their length while they are being rotated.

32. In a binder, the combination with grain cutting mechanism and an inclined conveyor adapted to receive the stalks of grain standing on end and convey them in an inclined position with their butts lowermost, of an inclined binder table associated with said conveyor, means for binding the stalks on said table into bundles, means for rotating the bundles to discharge them in an approximately horizontal position, and a rod extending longitudinally of said table and adapted to engage the bundles intermediately of their length to support them while they are being rotated.

33. In a binder, an inclined binder table having an upper head supporting portion and a lower butt supporting portion, and means for moving the bundles of grain standing on end along said table, said head and butt supporting portions being curved downwardly and upwardly, respectively, at the discharge end of the table, and a rod carried by said upper head supporting portion and adapted to engage the bundles intermediately of their length as they are acted on by said curved portions.

34. In a binder, the combination with grain cutting mechanism, and an inclined conveyor adapted to receive the stalks of grain standing on end and convey them in an inclined position with their butt ends lowermost, of an inclined binder table alined with said conveyor and receiving the stalks therefrom, means associated with said table for binding the inclined stalks into bundles, and means for turning the bundles about an intermediate axis to an approximately horizontal position.

35. In a binder, the combination with grain cutting mechanism, and an inclined conveyor adapted to receive the stalks of grain standing on end and convey them in an inclined position with their butt ends lowermost, of an inclined binder table alined with said conveyor and receiving the stalks therefrom, means associated with said table for binding the inclined stalks into bundles, means for turning the bundles to an approximately horizontal position, and means for supporting the bundles intermediately of their length while they are being turned.

36. In a binder, the combination with grain cutting mechanism, and an inclined conveyor adapted to receive the stalks of grain standing on end and convey them in an inclined position with their butt ends lowermost, of an inclined binder table alined with said conveyor and receiving the stalks therefrom, means associated with said table for binding the inclined stalks into bundles, means for turning the bundles about an intermediate axis to an approximately horizontal position, and means associated with said binder table for evening the butts of the grain.

37. In a binding machine, a frame suspended for fore and aft movement about a transverse horizontal axis positioned near its upper extremity, the lower portion of said frame projecting forwardly from such axis and being provided at its forward extremity with a sickle, and an endless conveyor mounted on said frame back of the sickle for travel parallel with said horizontal axis, said conveyor being inclined downwardly and forwardly to receive the stalks of grain cut by the sickle and convey the same in an inclined position with their butt ends lowermost, the inclination of the conveyor being such that grain will rest securely by gravity against the conveyor, and will also be held by gravity against movement longitudinally of the stalks in the direction in which the heads point.

38. In a binding machine, a frame suspended for fore and aft movement about a transverse horizontal axis positioned near its upper extremity, the lower portion of said frame projecting forwardly from such axis and being provided at its forward extremity with a sickle, an endless conveyor mounted on said frame back of the sickle for travel parallel with said horizontal axis, said conveyor being inclined downwardly and forwardly to receive the stalks of grain cut by the sickle and convey the same in an inclined position with their butt ends lowermost, and a downwardly and rearwardly inclined butt shelf between the lower marginal portion of the conveyor and the sickle, on which the butt ends of the stalks rest, the inclination of the conveyor being such that grain will rest securely by gravity against the conveyor, and will also be held by gravity against the butt shelf.

39. The combination with a wheeled frame comprising a transversely disposed tubular casing, of downwardly and forwardly extending supporting means pivotally suspended adjacent to its upper end from said casing to swing fore and aft about the same as an axis, cutting mechanism carried by said supporting means adjacent to its lower end, conveying mechanism mounted on said supporting means between said cutting mechanism and said casing, a drive shaft rotatable in said casing, and driving connections between said shaft and said cutting and conveying mechanisms.

EDGAR E. METCALF.